United States Patent [19]
Highbloom

[11] Patent Number: 5,323,315
[45] Date of Patent: Jun. 21, 1994

[54] COMPUTER SYSTEM FOR MONITORING THE STATUS OF INDIVIDUAL ITEMS OF PERSONAL PROPERTY WHICH SERVE AS COLLATERAL FOR SECURING FINANCING

[75] Inventor: Lawrence Highbloom, Wynnewood, Pa.

[73] Assignee: Vintek, Inc., Wynnewood, Pa.

[21] Appl. No.: 739,638

[22] Filed: Aug. 2, 1991

[51] Int. Cl.⁵ ............... G06F 15/20; G06G 7/52
[52] U.S. Cl. .................................. 364/408; 235/379
[58] Field of Search ............. 364/401, 408; 235/375, 235/379; 395/925

[56] References Cited

U.S. PATENT DOCUMENTS

| | | | |
|---|---|---|---|
| 4,714,995 | 12/1987 | Materna et al. | 395/600 |
| 4,718,009 | 1/1988 | Cuervo | 364/408 |
| 4,727,243 | 2/1988 | Savar | 235/379 |
| 4,736,294 | 4/1988 | Gill et al. | 364/408 |
| 4,774,664 | 9/1988 | Campbell et al. | 364/408 |
| 4,799,156 | 1/1989 | Shavit et al. | 364/401 |
| 4,914,587 | 4/1990 | Clouse | 364/408 |
| 5,025,138 | 6/1991 | Cuervo | 235/379 |
| 5,063,507 | 11/1991 | Lindsey et al. | 364/408 |
| 5,241,466 | 8/1993 | Perry et al. | 364/401 |

OTHER PUBLICATIONS

Figel, T., "Use of Auto Insurance Database Grows," *National Underwriter* (May 25, 1987).

*Primary Examiner*—Roy N. Envall, Jr.
*Assistant Examiner*—Laura Brutman
*Attorney, Agent, or Firm*—Panitch Schwarze Jacobs & Nadel

[57] ABSTRACT

A system for monitoring the status of individual items of personal property which serve as collateral for securing financing. The system receives financing information from a first financing source and a second financing source. A unique identification code is associated with each individual item of personal property which serves as collateral for securing financing from the first and second financing sources. The financing information from the first financing source is compared with the financing information from the second financing source based at least in part upon the identification codes of the items of personal property to identify particular items of personal property that simultaneously serve as collateral to secure financing from both the first and second financing sources. The affected first and second financing sources are notified about the identified item of personal property.

26 Claims, 5 Drawing Sheets

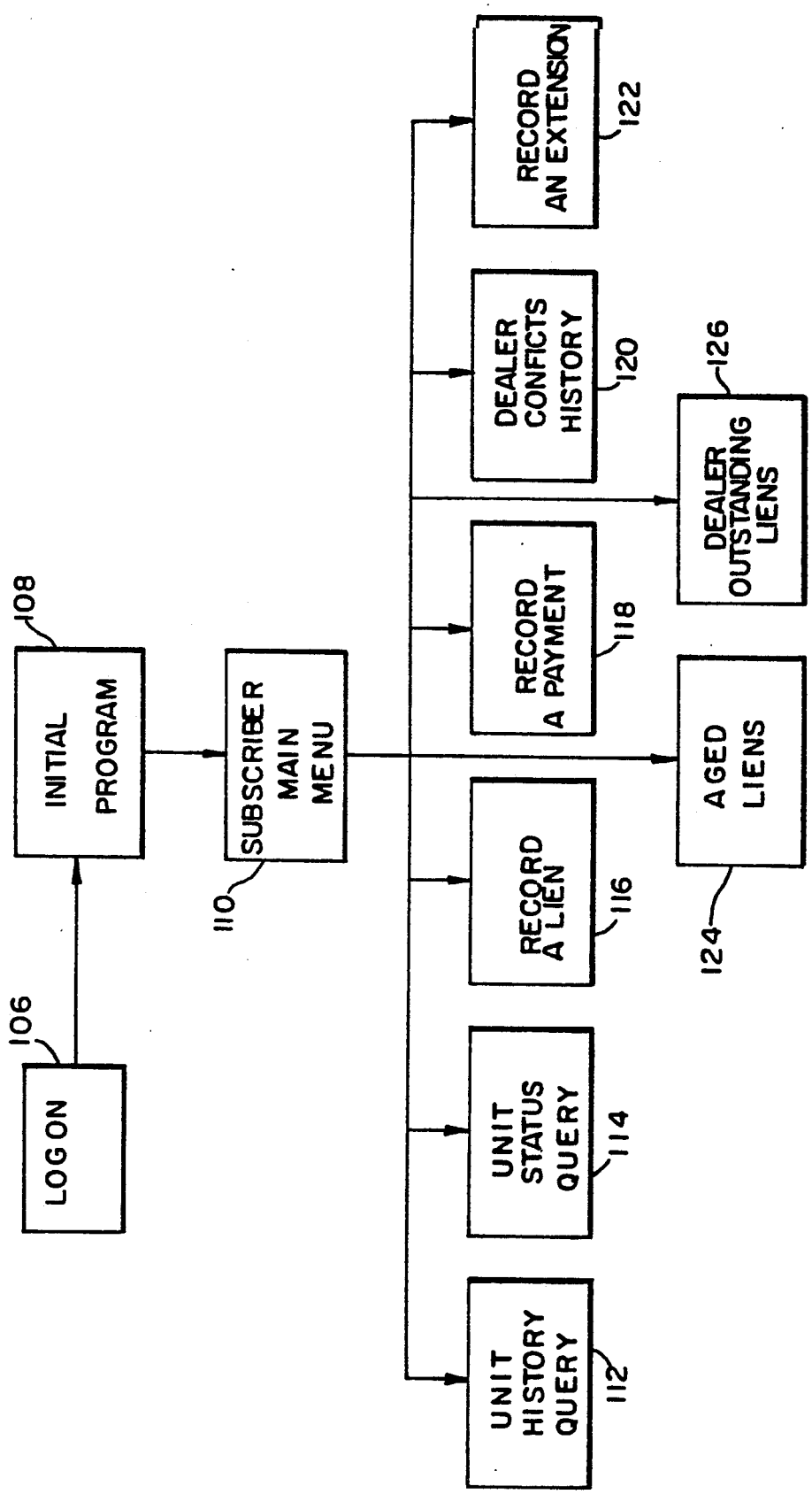

COMPUTER SYSTEM FOR MONITORING THE STATUS OF INDIVIDUAL ITEMS OF PERSONAL PROPERTY WHICH SERVE AS COLLATERAL FOR SECURING FINANCING

BACKGROUND OF THE INVENTION

The present invention relates to a method and system for monitoring the status of individual items of personal property which serve as collateral for securing financing and, more particularly, to a method and monitoring system for receiving financing information from a plurality of financing sources and for comparing the financing information received from the different financing sources to determine whether a particular item of personal property simultaneously serves as collateral to secure financing from more than one financing source.

In many inventory related industries, retail dealers, such as vehicle or boat retailers, obtain floor plan credit lines from an inventory financing source, such as a bank or captive finance company (i.e., GMAC, Ford credit, Chrysler credit) for the purchase of the vehicle or boat inventory. The floor plan credit line is a loan granted by the financing source to the retailer which acts as a revolving credit line for purchasing inventory stock, e.g., a plurality of vehicles by a vehicle dealership. As the inventory is sold, new inventory stock is received by the retailer. Therefore, the financing source has a specific security interest in each item of inventory, but cannot perfect its interest using customary procedures, such as individual UCC filings for each item of inventory. Therefore, the loan may be collateralized with a blanket lien with additional cross collateralization. Typically, the floor plan loan is to be repaid at least in part within a short predetermined period of time (i.e., 3-5 days) after a particular inventory item is sold, regardless of whether the retail customer pays in full or finances the purchase.

Normally, the financing source monitors the status of the floor plan credit line by making periodic visits to the retailer and manually checking for the presence of the particular inventory items. The inventory items are typically identified by a serial number associated with the particular item. Manual confirmation of the credit status of the inventory items is time consuming and because it is not done often, is normally not up to date. Some retailers take advantage of the delay in ascertaining the correct status of the collateral items by not immediately repaying the loan once an inventory item is sold; using the money as a "float" for financial gain. In some situations, the retailer may be financially unstable and may eventually be unable to repay the floor plan credit line. Since the collateral has been sold in the ordinary course of business, the floor plan financing source whose loan is no longer secured by collateral in possession of the dealer, has no recourse against the consumer who purchased the item. In effect, the collateral has been relinquished by the floor plan financing source to the consumer financing source, which can repossess the item in the event that the consumer defaults on his/her loan obligation. Additionally, if the retailer files for bankruptcy, the financing source which financed the floor plan credit line becomes an unsecured creditor and may not have much of a chance of having its debt repaid.

The financing sources also typically monitor the status of consumer installment loans to prevent consumers from taking advantage by not repaying their loans. In some situations, the consumer may try to take advantage of the financing source by engaging in multiple loan contracts, such that each loan contract is with a different financial lender. In the event of default of one or more of the loans by the consumer, it is later discovered that the lenders are sharing the collateral which is inadequate to cover all the loans. Additionally, sometimes consumers finance the purchase of new personal property by trading in old personal property such as in the purchase of a new vehicle. If the consumer has an outstanding loan for the old personal property which is not subsequently repaid the financing source has no recourse to recover the balance of the loan.

There is a need for a system which can monitor the status of a floor plan credit line and the credit status of a particular inventory item on a more frequent basis, preferably at least daily. The present invention is directed to a method and system for monitoring the status of individual items of personal property which serve as collateral for securing financing which generally receives input preferably on a daily basis from a plurality of subscribers. The subscribers are typically financing sources which provide floor plan credit lines and financing sources which provide any type of consumer credit, such as, but not limited to, loans, leasing, leaseline financing and credit union loans for the ultimate purchase of the collateral items. The data is organized by the serial number or some other unique identification code of each inventory item and any subsequent loan entry is associated therewith. If the monitoring system determines that two credit loans simultaneously exist for a particular inventory item, at least one respective financing source is notified so that appropriate action can be promptly taken. In this manner, the inventory financing source can learn at the earliest known point in time when a subsequent consumer loan has been granted so that it can make sure its loans are promptly repaid.

SUMMARY OF THE INVENTION

Briefly stated, the present invention comprises a system for monitoring the status of individual items of personal property which serve as collateral for securing financing. The system comprises means for receiving financing information from a first financing source. A unique identification code is associated with each individual item of personal property which serves as collateral for securing financing by the first source. The system also includes means for receiving financing information from a second financing source which includes a unique identification code which is associated with each individual item of personal property which serves as collateral for securing financing from the second source. Comparison means compares the financing information received from the first source with the financing information received from the second source based at least in part upon the identification codes of the items of personal property to determine whether a particular item of personal property simultaneously serves as collateral to secure financing from both the first and second financing sources. Identifying means identify a particular item of personal property which simultaneously serves as collateral to secure financing from both the first and second financing sources. Notifying means notifies at least one of the first and second financing sources about the identified item of personal property.

The present invention is also directed to a method for monitoring the status of individual items of personal property which serve as collateral for securing financing. The method comprises receiving financial information from a first financing source including a unique identification code associated with each individual item of personal property which serves as collateral for securing financing by the first financing source. Financing information from a second financing source is received which includes a unique identification code associated with each individual item of personal property which serves as collateral for securing financing from the second financing source. The financing information received from the first source is compared with financing information received from the second source. The comparison is based at least in part upon the identification codes of the items of personal property to determine whether a particular item of personal property simultaneously serves as collateral to secure financing from both the first and second financing sources and is identified. At least one of the first and second financing sources for which an identified item of personal property serves as collateral is notified that the identified item of personal property also serves as collateral for another financing source.

BRIEF DESCRIPTION OF THE DRAWINGS

The foregoing summary, as well as the following detailed description, will be better understood when read in conjunction with the appended drawings. For the purpose of illustrating the invention, embodiments which are presently preferred are shown in the drawings. It is understood, however, that this invention is not limited to the precise arrangements and instrumentalities shown.

In the drawings:

FIG. 6 is a flow diagram of the processes which are available to the auxiliary data bases of FIG. 1.

DESCRIPTION OF THE PREFERRED EMBODIMENT

Figure 1:
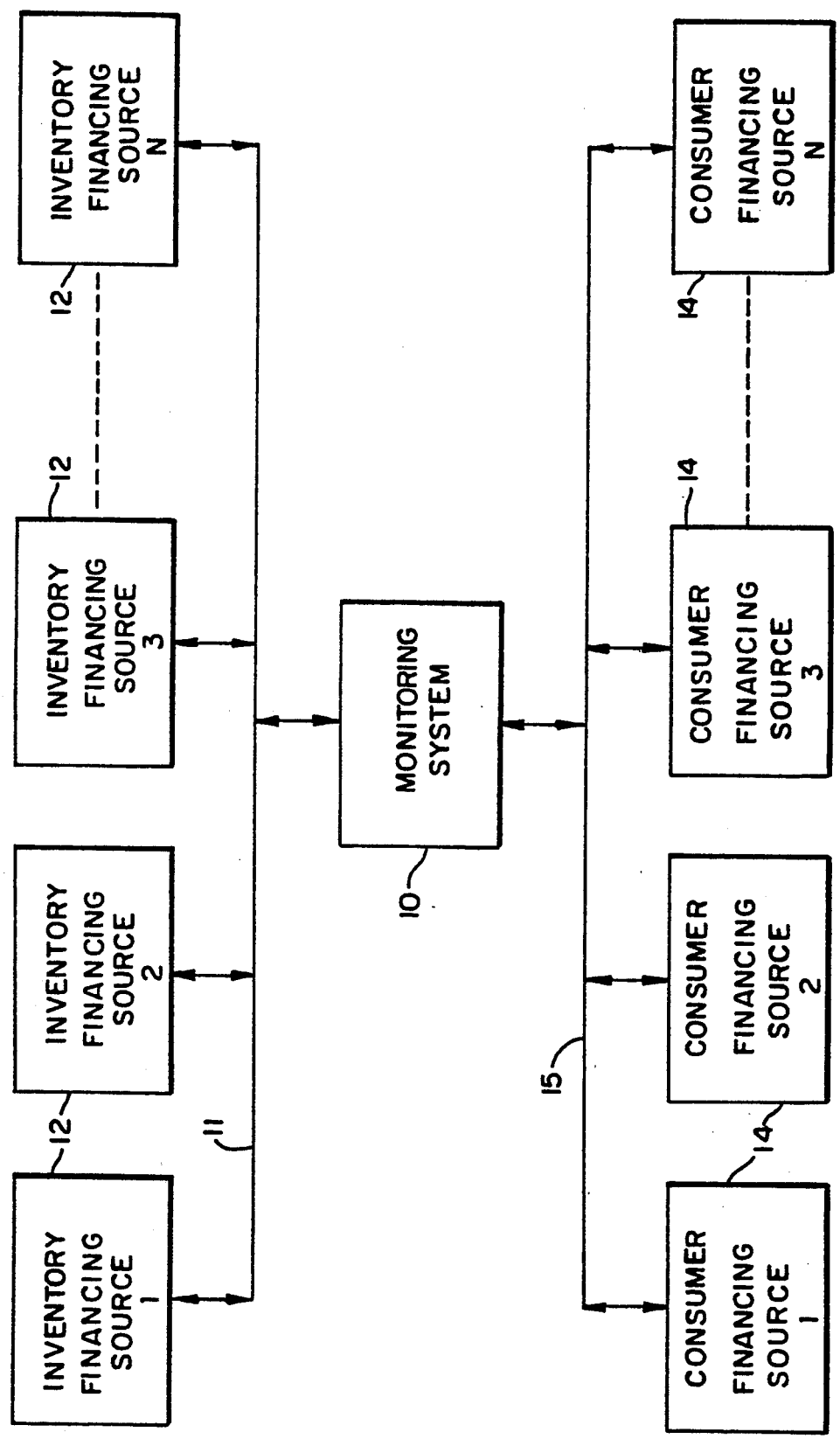
FIG. 1 is a schematic block diagram of a financing information monitoring system in accordance with the present invention.

Referring to the drawings in detail, wherein like numerals indicate like elements throughout, there is shown in FIG. 1 a block diagram of a system 10 for monitoring the status of individual items of personal property which serve as collateral for securing financing in accordance with the present invention. The monitoring system 10 is preferably a relational information database or a centralized computer. In the preferred embodiment, an AS400 Model D35 unit is used, however, it is to be understood by those skilled in the art that any compatible computer system can be used without departing from the scope and the spirit of the invention. The monitoring system 10 can also incorporate a number of personal computers (not shown) which act as support systems to the centralized system.

The monitoring system 10 is bidirectionally connected to a plurality of first financing sources by a communications link 11. In the preferred embodiment, the first financing sources are inventory financing sources 12 which transmit to the monitoring system 10 financing information relating to a floor plan credit loan for individual items of personal property to be included in inventory stock of a retail or other dealer. Typically, the individual items of inventory serve as collateral for securing the floor plan credit loan. A floor plan credit loan is typically granted to a retail dealer for the purchase of inventory which is ultimately sold by the dealer. Once a particular item of inventory is sold, the retail dealer is expected to begin repayment of the loan. A typical example is a loan granted by a captive financing source, such as GMAC, to an individual GM dealer for financing the particular dealer's inventory of GM vehicles. The inventory financing source 12 can be any conventional financing source such as, but not limited to, a commercial bank, a captive finance company, a credit union, or any other conventional lending institution. The financed inventory can be any item of personal property which is normally relatively expensive, such as, but not limited to, vehicles, boats, heavy construction equipment, and any other type of high priced consumer good which is typically financed.

The monitoring system 10 is also bi-directionally connected to a plurality of second financing sources by a communication link 15. In the present embodiment, the second financing sources are typically consumer financing sources 14. The consumer financing sources 14 transmit financing information associated with individual items of personal property, the purchase of which are financed by a consumer for personal, business or other use. The financing information provided by the consumer financing source 14 may be related to the financing of items such as, but not limited to, vehicles, household appliances, and other types of personal property which are normally financed. Typically, the personal property which is being financed by a consumer loan serves as collateral for securing financing from the consumer financing source. The consumer financing source can be any type of conventional lending institution such as, but not limited to, a commercial bank, a captive financing company, a credit union or any other type of conventional lending institution. A typical example is a commercial bank which loans a consumer money to purchase a vehicle from a dealer, the vehicle then becoming collateral to secure the consumer loan.

The monitoring system 10 receives the financing information from the inventory financing sources 12 and the consumer financing sources 14 on a periodic basis. The financing information received includes information pertaining to a floor plan credit loan or a consumer loan being extended or the receipt of money which is paid for the repayment of a particular loan. In the preferred embodiment, the financing information is received on a daily basis, however, any suitable periodic transmission of the financing information, for example four times per day, twice per week, weekly, biweekly, etc., can be done without departing from the scope and spirit of the present invention.

The monitoring system 10 automatically compares the financing information received from the inventory financing sources 12 and the consumer financing sources 14. The financing information is analyzed by the monitoring system to track the prompt repayment of a loan, to note any delinquent payments and to determine if a particular item is simultaneously being financed by two financing sources, such as by both an inventory financing source 12 and a consumer financing source 14 as will be discussed hereinafter. Included in the financing information for both the inventory financing sources 12 and the consumer financing sources 14 is a unique identification code which is associated with each item of personal property. In the case of a vehicle, the vehicle identification number (VIN) may be used.

Every item of personal property which is financed by either the inventory financing source 12 or the consumer financing source 14 must be identified by a unique identification code. The identification codes of the personal property financed by the inventory financing sources 12 and the consumer financing sources 14 are compared to determine whether a particular item of personal property simultaneously serves as collateral to secure financing from two financing sources, such as one or more inventory financing sources 12 and/or one or more consumer financing sources 14.

The monitoring system 10 identifies those particular items of personal property which simultaneously serve as collateral to secure financing from two financing sources simultaneously and notifies at least one, and preferably both, of the financing sources that the same item of personal property has been identified as simultaneously securing two loans. The financing sources can be notified in any conventional manner such as, but not limited to by mail, facsimile transmission, or direct transmission from the monitoring system 10 to a financing source computer via a pair of modems. Financing of a particular item of personal property by two different financing sources is undesirable since the item of personal property cannot adequately serve as collateral for both loans and appropriate action must be taken to either obtain repayment of one of the loans or to obtain additional property as collateral.

For example, a loan could be extended to a vehicle dealer by a captive financing company for a vehicle X. The vehicle dealer could later sell the vehicle X to a consumer who finances the purchase with a consumer loan extended by a credit union. If the vehicle dealer delays repaying the loan for vehicle X, two loans will remain outstanding on vehicle X. Since the vehicle dealer no longer has the collateral for the outstanding loan, i.e., vehicle X, if the vehicle dealer becomes financially troubled and is unable to pay the loan, the captive financing company may have trouble recouping its losses. If the dual financing of vehicle X is detected early and reported to the captive financing company, then the captive financing company has a better chance of pursuing repayment of the loan.

Figure 2:
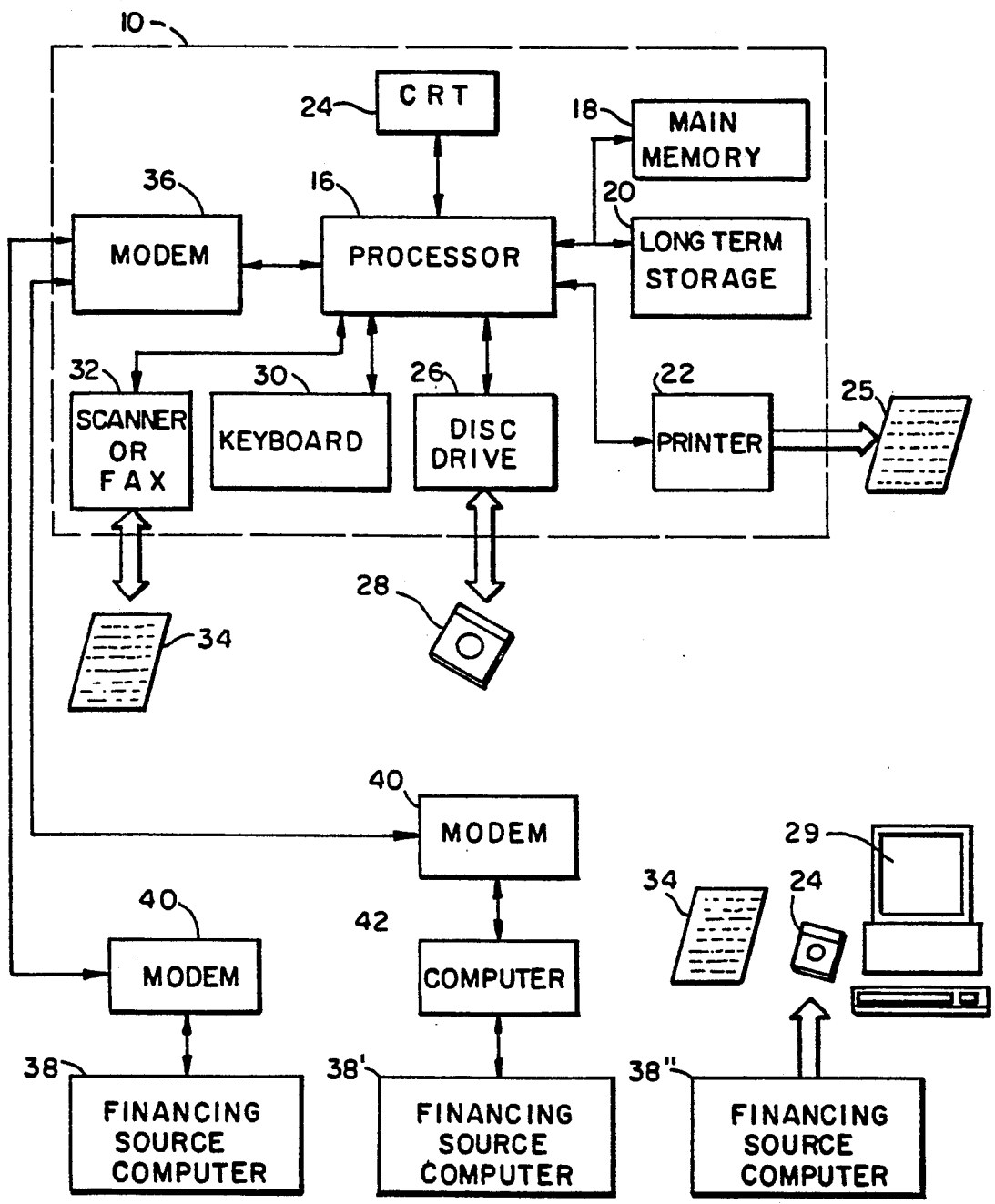
FIG. 2 is a schematic block diagram of the central and auxiliary data bases for the monitoring system of FIG. 1.

Referring specifically to FIG. 2, there is shown a more detailed schematic block diagram of the monitoring system 10 as well as the communication links 11, 15 between the inventory financing sources 12, the consumer financing sources 14 and the monitoring system 10. The monitoring system 10 includes a main processor 16 which preferably is a main frame computer, such as the AS400 data base processor. It is to be understood by those skilled in the art that any type of processor may be used in the monitoring system 10 without departing from the scope and spirit of the invention. The processor 16 preferably has adequate power to receive and process financing information from a large number of different financing sources.

Financing information transmitted by the inventory financing source 12 and the consumer financing sources 14 is received by the processor 16. The financing information which is received on an active basis is maintained in a main memory 18 associated with the processor 16. The main memory 18 is a volatile memory which temporarily stores financing information which is currently being inputted into the processor 16. The main memory 18 is preferably, but not necessarily, a semiconductor memory. Once the financing information has been inputted and analyzed the financing information is stored in a long-term memory 20. The long-term memory 20 is preferably a nonvolatile memory, such as a hard disc, magnetic tape, PROM or a floppy disc. The long-term memory 20 stores all transactions in which only a single financing loan has been made for a particular item of personal property by an inventory financing source 12 and in which the particular item of personal property has not subsequently been purchased by a consumer. The financing information relating to the particular item of personal property remains in the long-term memory 20 until the outstanding inventory financing loan is repaid. Financing information relating to a floor plan credit loan and a consumer loan active for the same item of personal property or any other loan conflicts are also stored in the long-term memory 20. Those financing transactions which have been completed but which may need to be later referred to are archived onto a floppy disk, magnetic tape or other off-line storage. It is to be understood by those skilled in the art that information may be periodically transferred from the hard disk to any off-line storage medium so that the hard disk is not entirely filled.

In the event of a conflict arising such as when a particular item of personal property is secured as collateral for securing a financing loan from both an inventory financing source 12 and a consumer financing source 14, a report containing the financing information for both of the related financing loans is communicated to the affected inventory financing source 12 and the consumer financing source 14. The report can be sent by direct transmission from the monitoring system 10 to a financing source computer and viewed on a CRT associated with the computer or printed by a printer associated with the affected inventory financing source computer and consumer financing source computer in any conventional manner. It is to be understood by those skilled in the art that the printed report can be transmitted to only the affected inventory financing source 12 or the affected consumer financing source 14 instead of both financing sources. The printer associated with the inventory financing source computer or the consumer financing source computer can also be used to provide a printed copy of the daily transactions which are received from the inventory financing sources 12 and the consumer financing sources 14. In the preferred embodiment, the daily report sent to a particular financing source only contains financing information directly related to that particular financing source. However, it is to be understood by those skilled in the art that any financing information can be sent to any financing source without departing from the scope and spirit of the invention.

In addition, a CRT 24 is attached to the processor 16 which enables a user of the monitoring system 10 to view a particular financial transaction on the display screen of the CRT 24. The CRT 24 can also be used to display previous financial transactions which are stored either in the main memory 18 or the long-term memory 20.

A disc drive 26 is associated with the processor 16 for allowing the transfer of data from a remote location to be entered into the processor 16 by means of a floppy disk 28 or magnetic tape. It is to be understood by those skilled in the art that the floppy disk 28 can be of any suitable size which is compatible with the disc drive 26. Data received from the disc drive 26 can either be actively used in the processor 16 and displayed on the CRT 24 or retained in the long-term memory 20 of the processor 16. A keyboard 30, also associated with the processor 16, allows a user to actively input data into the processor 16. The keyboard 30 is a conventional ASCII or other type keyboard which is typically used with the processor 16.

A scanner or a facsimile machine 32 can be associated with the processor 16 to allow data in the form of a printed document 34 to be inputted into the processor 16. The printed document 34 can be scanned by the scanner 32 and transmitted in the form of electrical data signals to the processor 16 in the manner which is well-known in the art. The data signals can either be displayed on the CRT 24 or stored in the long-term memory 20 for later use.

Data can also be received or transmitted from a remote location by use of a modem 36 which provides a communication link between the processor 16 and a remotely located financing source computer 38. A second modem 40 is associated with the financing source computer 38, provides an appropriate telecommunications link utilizing a telephone or data line. Financing information is transferred from the financing source computer 38 to the modem 40 in the form of electrical data signals. The electrical data signals are transmitted from the second modem 40 over a telecommunications link to the modem 36 associated with the processor 16. As discussed above, the received electrical data signals can either be displayed on the CRT 24 or can be stored in the long-term memory 20 for later use.

In an alternate embodiment, a second computer 42 is associated with the financing source computer 38'. Financing information which is to be transmitted to the monitoring system 10 is transferred from the financing source computer 38, to the second computer 42 by any conventional means, such as, but not limited to, a direct data link, a floppy disk, magnetic tape or by manually inputting the information into the second computer 42. The financing information is transmitted from the second computer 42 in the form of data signals to the second modem 40 which transmits the data signals over a telecommunications link to the first modem 36. The first modem 36 transfers the electrical data signals to the processor 16 for further processing of the data. Alternatively, the financing source computer 38" can provide a printed document of the data which is to be placed within the monitoring system 10 or place the electrical data signals on a floppy disk 28 or magnetic tape. The printed copy 34, magnetic tape or the floppy disk 28 can then be delivered to the monitoring system in any conventional manner, such as, but not limited to, being hand carried, mailed or sent by private courier. Once the materials, in the form of the printed copy 34, magnetic tape or the floppy disk 28, are received by the monitoring system 10, they can be manually inputted into either the keyboard 30 or the disc drive 26 or can be scanned by the scanner 32 and are transmitted to the processor 16 for further processing.

Information may be transmitted from the processor 16 of the monitoring system 10 to the financing source computer 38 in the number of the ways. As discussed above, printed documents 25 containing various reports, such as conflict reports or daily transaction reports may be obtained from the printer 22 associated with the processor 16. In addition, billing statements may be obtained indicating the subscriber charge for using the monitoring system 10. The printed documents 25 are delivered to an inventory financing source 12 or a consumer financing source 14 in any conventional manner, such as, by regular mail, by express mail or by a hand carrier. The received printed documents 25 are inputted into the financing source computer 38' associated with the particular inventory financing source 12 or consumer financing source 14 by any conventional means, such as, but not limited to, being scanned into the financing source computer 38' or being inputted via a keyboard (not shown) associated with the financing source computer 38'.

Information may also be transmitted from the monitoring system 10 to the financing source computer 38 by a floppy disk 28. A floppy disk 28 may be inserted into the disc drive 26 associated with the processor 16. Selected information may be transferred from the main memory 18 or the long term storage memory 20 associated with the processor 16 onto the floppy disk 28. The floppy disk 28 may then be delivered to the inventory financing source 12 or the consumer financing source 14 by any conventional means such as those discussed above. The floppy disk 28 is placed into a disc drive (not shown) of the financing source computer 38'. A user of the financing source computer 38' can either view the information on a CRT 29 associated with the financing source computer 38' or can obtain a printed document of the information via a printer (not shown) associated with the financing source computer 38'.

A scanner or fax 32 associated with the processor 16 may also be used to transmit information to the financing source computer 38. Once a printed document 25 of the information is obtained as discussed above, the scanner associated with the facsimile 32 can be used to scan the printed document 25 and transform the information into electrical signals. The electrical signals are transmitted from the processor 16 and are transferred via a modem 36 to a telecommunications network. The electrical signals transmitted from the processor 16 can be received by the financing source computer 38 in two different ways. The electrical signals can be received by a second computer 42 associated with the financing source computer 38" or the electrical signals can be directly transmitted to the financing source computer 38'.

In some instances, it may be beneficial for the information transmitted from the monitoring system 10 to be indirectly received by the financing source computer 38. Since most financing source computers 38 contain confidential information, it may be desirable to limit access to the financing source computer 38 by outside users, such as users of the monitoring system 10. In such an instance, the electrical signals transmitted from the processor 16 are received by a modem 40. The modem 40 transfers the electrical signals to a second computer 42 which is associated with the financing source computer 38" but which is not directly connected to the financing source computer 38". A subscriber at the inventory financing source 12 or the consumer financing source 14 can obtain the information from the computer 42 in any conventional manner, such as, but not limited to, displaying the information on a CRT associated with the computer 42, obtaining a printed document of the financing information or by transferring the financing information to a floppy disk. The financing information can also then be transferred from the second computer 42 to the financing source computer 38' by using any of these methods or by direct data link.

As is evident by the foregoing discussion, there are a number of different types of users which are associated with the monitoring system 10. A first type of user, generally an employee or agent, has physical or direct access to the monitoring system 10. A direct access user can directly access the monitoring system 10 by accessing the processor 16 in any conventional manner, such as, but not limited to, inputting information and commands via the keyboard 30, inputting or retrieving information onto a floppy disk 28 or magnetic tape or by obtaining a printed document containing various financing information from the printer 22. The direct access user is responsible for compiling the financing information received from the inventory financing source 12 and the consumer financing source 14 and determining if any conflicts exist. A direct access user is also able to update and delete information relating to the dealerships and financing sources associated with the monitoring system 10.

A second type of user is a subscriber at an inventory financing source 12 or a consumer financing source 14. Financing information is regularly transferred from the inventory financing source 12 and the consumer financing source 14 to the monitoring system 10 by using any of the methods discussed above. A subscriber is responsible for inputting financing information relating directly to that particular financing source. A subscriber can also request reports indicating the presence of conflicts between an inventory financing source 12 and a consumer financing source 14. As will be discussed hereinafter, a direct access user has a different scope of accessibility than a subscriber. In other words, there are certain limits to the accessible information which can be obtained by any particular user or subscriber depending upon the level of accessibility granted to the particular user or subscriber.

Figure 3:
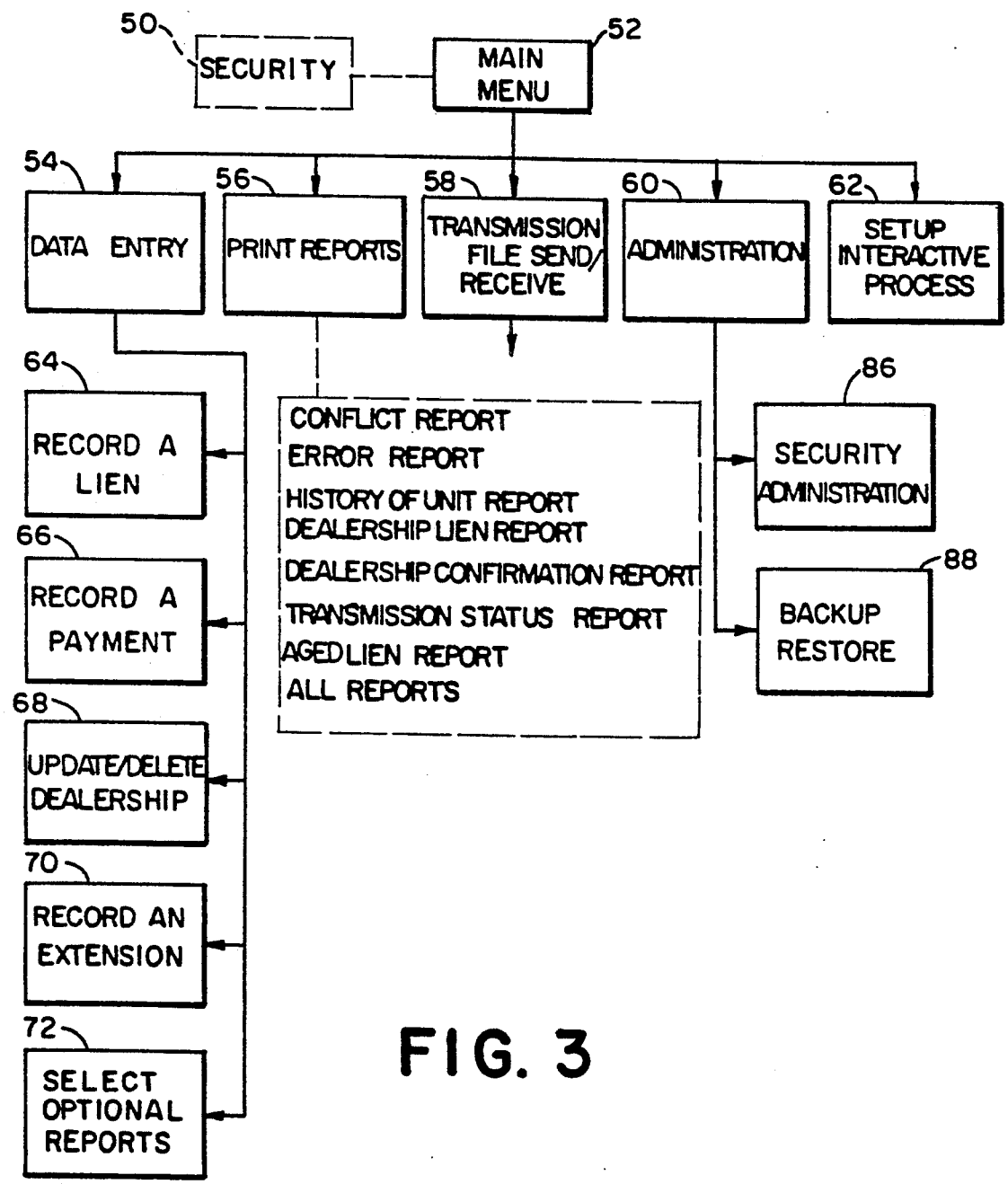
FIG. 3 is a flow diagram of the functions performed by the database of the monitoring system of FIG. 1.

Referring specifically to FIG. 3, there is shown a general block diagram depicting the functions which can be performed by the monitoring system 10. It is to be understood by those skilled in the art that the user directly gains access to the monitoring system 10 and the subscriber may indirectly gain access to the monitoring system via the financing source computer 38. Certain precautionary measures must be taken in order to prevent an unwanted party from entering the system 10. Because the financing information maintained in the monitoring system 10 is of a highly confidential nature it is important that unauthorized personnel are unable to gain access to the monitoring system. In addition, a subscriber wishing to gain indirect access to the monitoring system 10 from a financing source must have proper authorization. Since financing source computers 38 also contain data of a highly confidential nature, access to the monitoring system by a subscriber may be achieved through a second computer 42 associated with the financing source computer 38 to prevent tampering with the financing source computer 38.

In order for a user or a subscriber to log on to the monitoring system 10, the user must first be validated by security 50. A user wishing to gain access to the monitoring system 10 must enter the proper identification code upon request which is validated by the monitoring system 10. The monitoring system 10 compares the inputted identification code which can comprise alphanumeric characters, with a table of acceptable access codes stored in the memory 18 associated with the processor 16. In the preferred embodiment, a user or subscriber wishing to gain access to the monitoring system 10 must enter an individual user code and password as well as a financial institution code which corresponds to the financial institution with which the user is associated. If one of the codes is incorrectly inputted into the keyboard 20 of the monitoring system 10, the monitoring system 10 will request the user to re-input all of the codes. If after a number of unsuccessful tries, the user or subscriber does not enter the correct identification codes and passwords for the individual and financial institution, the monitoring system 10 will prevent the user or subscriber from reattempting to enter the system 10.

Once the user or subscriber has successfully entered the monitoring system 10, a main menu 52 will appear on the CRT 24 of the monitoring system 10 or the CRT (not shown) of the financing source computer 38. The main menu 52 provides a visual display on the CRT 24 of the various functions which can be performed by the monitoring system 10, depending on the category of the particular user. The functions include data entry 54, print reports 56, transmission of files sent/receive 58, administration 60 and set up interactive process 62 which will be described in detail hereinafter. A user can select any one of the above-mentioned functions by entering the selected function into the keyboard by highlighting the function name, by typing in a prompt associated with the function name, or by use of a mouse (not shown). Once a function is selected, the screen of the CRT 24 displays the selected function.

If data entry 54 is selected, a new screen appears listing the possible functions which can be selected by the data entry user or subscriber. The possible functions include recording a lien 64, recording a payment 66, updating or deleting a dealership 68, recording an extension 70 or selecting optional reports 72 as will be discussed in further detail hereinafter. As discussed above, the desired function can be selected by inputting the proper prompts into the keyboard 20 of the monitoring system 10 or the keyboard (not shown) of the financing source computer 38.

If a subscriber wishes to record a lien 64, the subscriber inputs the proper request into the keyboard of the financing source computer 38 and the screen for inputting the information necessary to record a lien is displayed on the CRT of the financing source computer 38. The recording of a lien is typically entered by an inventory financing source 12 or a consumer financing source 14. For the sake of brevity, it will be assumed that the monitoring system 10 is primarily used for inputting and outputting financing information related to vehicle floor plan credit loans and vehicle consumer loans. However, it is to be understood by those skilled in the art that any type of floor plan credit loan or consumer loan can be processed by the monitoring system 10.

In order to enter data related to recording a lien 64, recording a payment 66 or recording an extension 70, information relating to the vehicle must be inputted into the financing source computer 38 by any conventional means such that the vehicle can be uniquely identified as compared to other vehicles. Such information should include the vehicle identification number (VIN), the year, make and model of the vehicle, the date the lien is recorded, the amount of the lien, the amount paid and any other additional information requested. Financing information is typically furnished by an inventory financing source 12 or a consumer financing source 14 upon the extension of a loan to the monitoring system 10. If the make or the model is incorrectly inputted into the monitoring system 10, then a table listing the possible makes and/or models will be retrieved from the memory 18 of the processor and be displayed on the screen of the CRT 24. The subscriber may select the correct make and model for that particular vehicle from the displayed list. It is be understood by those skilled in the art that if the data base is directed to financing information which is related to items other than vehicles, the appropriate identifying information should be inputted into the monitoring system 10.

If a user or subscriber wishes to update or delete a dealership 68, the user must enter the dealer I.D. number, the dealer name, address and telephone number, and any other information which is requested by the prompt screen displayed on the CRT 24. A dealership may be updated because of a change of address, a change in phone number or a change in ownership. Likewise, a dealership may be deleted if it becomes insolvent or is taken over by another business. Once the required information is inputted into the processor 16, the user can indicate whether the particular dealership should be updated or deleted by activating the appropriate prompt.

The subscriber can also obtain optional reports which include such information as history of a particular vehicle, history of dealer conflicts, dealer outstanding liens and aged lien reports. History of dealer conflicts relates to a situation where the particular dealership has obtained a floor plan credit loan for a particular vehicle and the vehicle has been subsequently purchased via a consumer loan. If both loans are outstanding, then a dealer conflict exists. Again, in order to identify the particular vehicle or dealership to which the information pertains, the proper vehicle I.D. number or dealer I.D. number must be inputted into the monitoring system 10.

The subscriber may also wish to obtain a printed copy of a report 56 containing data from a recent transaction, i.e., once data has been entered into the monitoring system 10. Alternatively, the subscriber can retrieve a particular report relating to an older transaction from the long-term memory 20 of the processor 16 and request that the information be sent to the financing source using any of the methods described above. The types of reports for which copies can be obtained include, but are not limited to, the following: conflict reports, error reports, history of unit reports, dealership lien reports, dealership confirmation/changes reports, transmission status reports, aged lien reports or all reports. Once a particular report is selected by the subscriber, the report information is retrieved from the long-term memory 20 of the processor 16 and a copy of the report is transmitted to the financing source computer 38. Alternatively, the selected report can be displayed on the CRT of the financing source computer 38 or can be printed out by the financing source computer.

Figure 4:
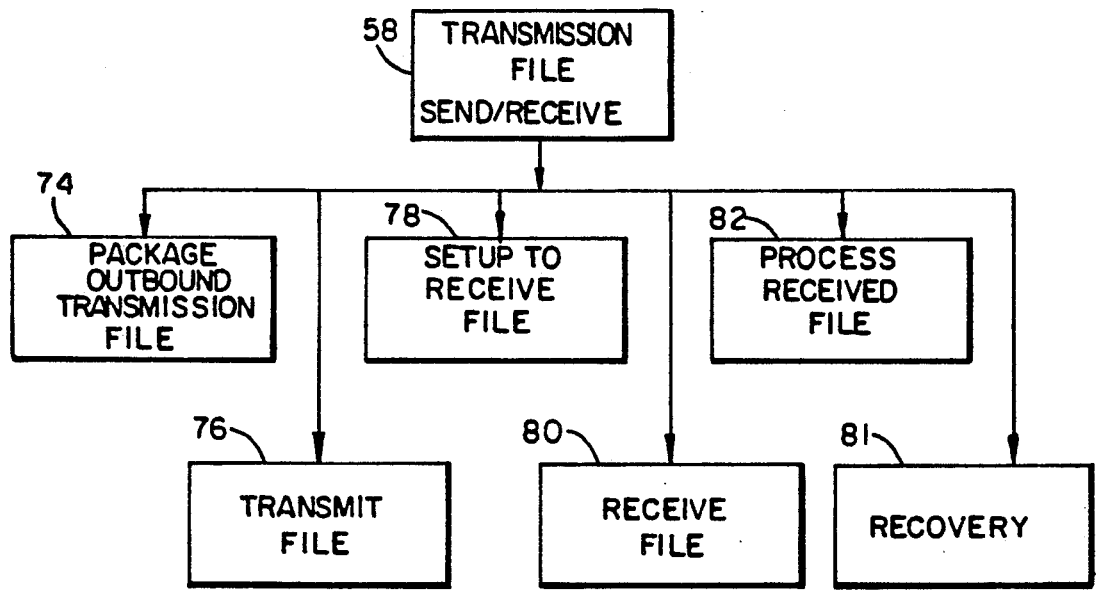
FIG. 4 is a detailed flow diagram of the transmission file send/receive process of the database processes of FIG. 3.

If a user or subscriber wishes to send or receive a file, the user or subscriber selects transmission file send/receive 58. Referring specifically to FIG. 4, the transmission file send/receive can automatically perform the following functions: package outbound transmission 74, transmitting a file 76, setting up to receive a file 78, receiving a file 80, processing the received file 82 and recovery 84. The transmission file send/receive function is used to receive electrical data signals from inventory financing sources 12 and consumer financing sources 14 and to transmit electrical data signals from the monitoring system 10 to the inventory financing sources 12 or the consumer financing sources 14. The electrical data signals which are received or transmitted to or from the monitoring system 10 must meet the appropriate security provisions as discussed above.

If a user wishes to enter the administration file 60, a screen is displayed on the CRT 24. The screen includes two prompts which are directed to security administration 86 and back up restore 88. If a user selects security administration 86, the user is able to either add, delete or change the security access codes of a particular user. The parameters which can be changed include, but are not limited to, user I.D., user name, user password and the access level permitted to the user. The access level can entitle the user to gain access to all aspects of the monitoring system 10 or can limit the access levels to only particular screens as will be discussed hereinafter. A user having the proper access level can also obtain a list of all persons who are authorized to access the monitoring system 10.

A user or subscriber can also select a back up restore file 88 which is part of the administration function 60. When the back up restore file 88 is selected, the appropriate prompts are displayed on the CRT 24 of the processor 16 or the CRT of the financing source computer 38. The prompts include a daily back up prompt or a complete application back up. If the daily back up file is selected, all data entries and other inputting transactions which have occurred in the monitoring system 10 are stored in a back up file. If a complete application back up file is selected, all the data and information which is stored in the monitoring system 10 is maintained in a back up file.

If a subscriber wishes to directly access the monitoring system 10, the subscriber enters the set up interactive processor file 62. The set up interactive processor file 62 allows a subscriber to directly log-on to the monitoring system to perform any of the above-described functions which can be performed by the subscriber.

Figure 5:
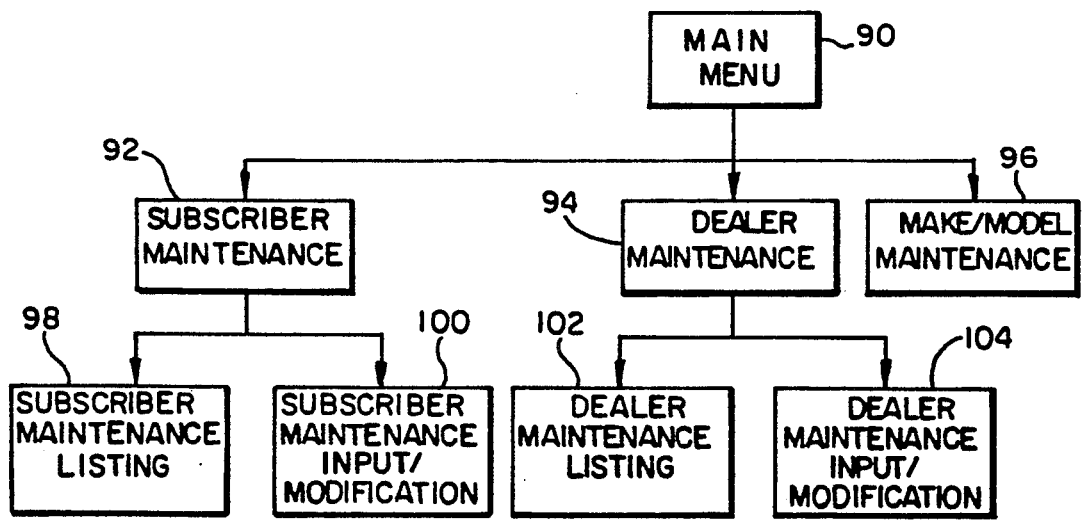
FIG. 5 is a flow diagram of the processes which are performed by the centralized database of FIG. 1.

Referring specifically to FIG. 5, there is shown a block diagram of the access levels available only to those users who directly access the processor 16 of the monitoring system 10. Once a user gains access to the monitoring system 10 by entering the appropriate security access codes and passwords as described above, a main menu is displayed on the screen of the CRT 24 of the processor 16. The main menu allows access into subscriber maintenance files 92, dealer maintenance files 94 and make/model maintenance files 96. A user of the monitoring system 10 chooses the appropriate file by either entering the file name into the keyboard 20 of the processor 16 or by activating a prompt which is entered into the keyboard 20. It is to be understood by those skilled in the art that any conventional means can be used to enter the prompt into the computer, such as, but not limited to, a mouse, a light pen or by a touch screen. If a user wishes to enter the subscriber maintenance file 92, a prompt will appear on the screen of the CRT 24 requesting the subscriber I.D. number and name. The subscriber is either the inventory financing source 12 or the consumer financing source 14 which has financed a particular financing loan. Once the requested information is inputted into the processor 16, the processor retrieves from the memory 18 a listing of the subscriber including pertinent information, such as name, address and a list of financing loans which have been made by that particular subscriber. A user in the subscriber maintenance file 92 can also modify the subscriber information by manually inputting the changes into the keyboard 20 of the processor 16.

If a user enters the dealer maintenance file 94, a prompt will be displayed on the screen of the CRT 24 requesting a dealer I.D. number and name. The dealer I.D. number and name refer to a retail dealer, such as a car dealership. Once the proper I.D. number and name for the dealership have been entered into the processor 16, the processor retrieves from the memory 18 a dealership listing which includes pertinent information, such as, but not limited to, the name, address and the listing of loans which have been financed for the particular dealership. A user accessing the dealer maintenance file 94 can also modify the dealership information.

If the user accesses the make/model maintenance file 96, the user can obtain a listing of all the makes and models of vehicles which are stored within the memory 18 of the processor 16. A user in the make/model maintenance file 96 is also capable of adding or deleting particular makes and/or models to the listing.

Referring specifically to FIG. 6, there is shown a block diagram of the access levels available to a subscriber using the monitoring system 10 either from an inventory financing source 12 or a consumer financing source 14. The subscriber initially accesses the monitoring system 10 by logging on 106 to the system 10 via the financing source computer 38 or the second computer 42. The log on process 106 includes the entry of the user I.D. number, name and password as has been discussed above. Assuming that a correct I.D. number, name and password have been entered, the security system of the monitoring system 10 allows the subscriber to indirectly have access to the monitoring system 10.

Once a subscriber has successfully logged on to the monitoring system 10, a listing of general messages or important information will be displayed on the screen of the subscriber's financing source computer 38. The initial program 108 can also include notices, such as periods in which the monitoring system 10 will be out of service and other important pieces of information. After the scrolling of the initial program, a subscriber main menu 110 is displayed on the screen of the financing source computer 38. The subscriber main menu lists a series of files accessible to the subscriber. The files include a unit history query file 112, a unit status query file 114, a file for recording a lien 116, a file for recording a payment 118, a dealer conflict history file 120, a file for recording an extension 122, an aged lien file 124 and a dealer outstanding lien file 126.

If a subscriber requests the unit history query file 112, a report is displayed on the screen of the financing source computer listing the financing information for the particular vehicle. The subscriber enters the vehicle identification number (VIN) for the vehicle of interest, and the processor 16 of the monitoring system 10 pulls from its long-term memory 20 the pertinent information which can include the date in which a dealership acquired the vehicle, the lending institution which processed the financing loan and whether or not the loan has been paid, and whether any consumer loan has been financed for the particular vehicle.

If a subscriber accesses the unit status query file 114, the subscriber obtains a listing of all outstanding liens for the particular vehicle by entering the vehicle identification number (VIN) for that particular vehicle. The current outstanding liens include floor plan credit loans as well as consumer credit loans. If a subscriber accesses the record a lien file 116, record a payment file 118 or record an extension file 122, the subscriber enters the appropriate data relating to a particular vehicle to indicate the financing transaction which has been handled by the subscriber. As discussed above, the information entered will include the vehicle identification number, year, make, model and dealership for which the car has either been purchased or sold. If a subscriber accesses the dealer conflict history file 120, a prompt will be displayed on the screen of the financing source computer 38 requesting the I.D. number for the particular dealership and a particular time period which the subscriber wishes to review. Once a particular dealership I.D. number and the time period are entered, a report will appear displaying any outstanding liens for a particular vehicle for that dealership which also have a consumer loan pending which uses that vehicle as the collateral for the loan. A subscriber can only request dealer conflict history information for that particular subscriber. However, it is to be understood by those skilled in the art that the system could encompass a dealer conflict history file which could be accessed for more than one subscriber without departing from the scope and spirit of the invention.

If a subscriber accesses the aged lien file 124, a report of all outstanding liens is displayed and the amount of time in which the lien has been outstanding. If the user requests access to the dealer outstanding liens query file 126, a prompt will appear requesting a particular dealer I.D. number. Once a dealer I.D. number has been entered, all outstanding liens for that particular dealership will be listed and the amount of time in which the lien has been outstanding.

From the foregoing description, it will be recognized by those skilled in the art that changes may be made to the above-described embodiment of the invention without departing from the broad inventive concept thereof. It is understood, therefore, that the invention is not limited to the particular embodiment disclosed, but is intended to cover all modifications which are within the scope and spirit of the invention as defined by the appended claims.

I claim:

1. A computer system for monitoring the status of individual items of personal property which serve as collateral for securing financing comprising:

a data input device for receiving financing information records from first and second financing sources, each financing information record from the first source including an identification code uniquely associated with an individual item of personal property which serves as collateral for securing financing by the first source, each financing information record from the second source including an identification code uniquely associated with an individual item of personal property which serves as collateral for securing financing by the second source;

a storage device for storing the financing information records from the first and second sources;

a processor for retrieving the stored financing information records from the first and second sources and for comparing the financing information records from the first source with the financing information records from the second source based at least in part upon the identification codes uniquely associated with the items of personal property to determine whether a particular individual item of personal property simultaneously serves as collateral to secure financing from both the first and second financing sources;

the processor for identifying a particular individual item of personal property which simultaneously serves as collateral to secure financing from both the first and second financing sources; and the processor providing an output to notify at least one of the first and second financing sources about the identified item of personal property.

2. The computer system according to claim 1, wherein the records from the first financing source and the second financing source are stored in the storage device in a relational database.

3. The computer system according to claim 2, wherein the financing information from the first financing source is electronically transferred to the computer system.

4. The computer system according to claim 2, wherein the financing information from the second financing source is electronically transferred to the computer system.

5. The computer system according to claim 2, wherein each financing information record from the first financing source is transmitted over a telecommunications system.

6. The computer system according to claim 2, wherein each financing information record from the second financing source is transmitted over a telecommunications system.

7. The computer system according to claim 2, wherein the output notifying at least one of the first and second financing sources comprises means for electronically transferring financing information records from the computer system to the first and second financing sources.

8. The computer system according to claim 1, wherein the financing information from the first financing source is transmitted to the data input device from a first financing source by a personal computer.

9. The computer system according to claim 1, wherein the financing information records from the first financing source are transmitted to the data input device from a first financing source by a main frame computer.

10. The computer system according to claim 1, wherein the financing information from the second financing source is transmitted to the data input device from a second financing source by a personal computer.

11. The computer system according to claim 1, wherein the financing information from the second financing source is transmitted to the data input device from a second financing source by a main frame computer.

12. The computer system according to claim 1, wherein the personal property which serves as collateral is a vehicle and where the identification code comprises a vehicle identification member (VIN).

13. The computer system according to claim 12, wherein each financing information record includes the year, made and model of the vehicle.

14. The computer system according to claim 1, wherein each financing information record is generally received from the first financing source and the second financing source on at least a daily basis.

15. The computer system according to claim 1, wherein the output notifying at least one of the first and second financing sources comprised a printed report.

16. The computer system according to claim 1, wherein each financing information record transmitted from the first financing source comprises information used to prepare floor plan credit loans for the purchase of inventory.

17. The computer system according to claim 1, wherein each financing information record transmitted from the second financing source comprises information used to prepare consumer credit loans for the purchase of a particular item of personal property.

18. A computer system for monitoring the status of vehicles which serve as collateral for securing inventory financing of vehicles comprising:

a data input device for receiving financing information records from first and second financing sources, each financing information record from the first source including a vehicle identification code uniquely associated with an individual vehicle which serves as collateral for securing dealer inventory financing by any of said first financing sources, each financing information record from the second source including a vehicle identification code uniquely associated with an individual vehicle which serves as collateral for securing financing from any of said second financing sources;

a storage device for storing the financing information records from the first and second sources;

a processor for retrieving the stored financing information records from the first and second sources, for comparing the received financing information records based at least in part upon the vehicle identification codes, and for identifying individual vehicles which simultaneously serve as collateral to secure financing from two of said financing sources;

the processor providing an output to notify at least one of the financing sources for which an identified vehicle serves as collateral that the identified vehicle also serves as collateral for another financing source.

19. The computer system according to claim 18, wherein each financing information record from the first financing source is electronically transferred to the computer system.

20. The computer system according to claim 18, wherein each financing information record from the second financing source is electronically transferred to the computer system.

21. The computer system according to claim 18, wherein each financing information record from at least one of the plurality of first financing sources is transmitted by a personal computer.

22. The computer system according to claim 18, wherein each financing information record from at least one of the plurality of second financing sources is transmitted by a personal computer.

23. The computer system according to claim 18, wherein each financing information record transmitted from the plurality of first financing sources comprises information used to prepare floor plan credit loans for the purchase of vehicle inventory.

24. The computer system according to claim 18, wherein each financing information record from the plurality of second financing sources comprises information used to prepare consumer credit loans for the purchase of vehicles.

25. The computer system according to claim 18, wherein the output comprises a report which is transmitted to the affected first financing source and second financing source.

26. The computer system according to claim 25, wherein the report is electronically transferred from the computer system to the first and second financing system.

* * * * *